Figure 1:
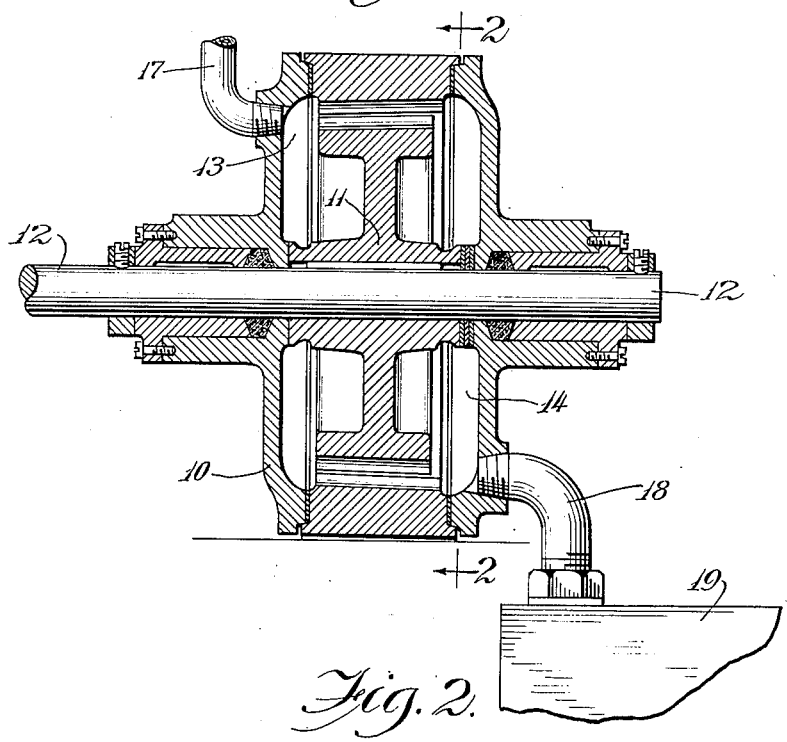

Dec. 13, 1938.   M. C. REYNOLDS   2,139,696

TREATMENT OF EGG MATERIAL

Filed July 2, 1937

Inventor
Marvin C. Reynolds
By McLaughlin & Wallenstein
Attorney

Patented Dec. 13, 1938

2,139,696

UNITED STATES PATENT OFFICE 2,139,696

TREATMENT OF EGG MATERIAL

Marvin C. Reynolds, Chicago, Ill.; The First National Bank of Chicago and Lulu E. Reynolds executors of said Marvin C. Reynolds, deceased, assignors to The Emulsol Corporation, Chicago, Ill., a corporation of Illinois Application July 2, 1937, Serial No. 151,647

11 Claims. (Cl. 99—113)

My invention relates to the treatment of liquid egg material, particularly liquid egg whites, and is primarily concerned with a novel method of producing an improved product. The process has special utility in connection with the preparation of dried egg whites wherein, prior to the drying operation, the egg whites are subjected to a fermentation process.

It has hitherto been proposed to subject liquid egg material to various processes in order to render the same homogeneous so that improved products would result whether the eggs were subsequently subjected to a freezing or a drying treatment in accordance with processes known in the art. Thus, for example, it has been proposed to pass the liquid egg whites through a line strainer or filter, forcing them therethrough under pressure. This process, while resulting in a definite improvement in the appearance and characteristics of the egg material, particularly from the standpoint of homogeneity of the resulting product, has various disadvantages, chief among which is the frequent necessity for discontinuing operation and cleaning off the heavy accumulation of chalaza, stringy portions, shells and the like. The frequency with which such cleaning operations are required depends, of course, upon the size of the screen or filter and the amount of liquid egg material which is passed therethrough but, in general, the process possesses the definite disadvantage indicated. Another objection to this process resides in the fact that there is considerable wastage of egg material by reason of the aforementioned accumulations on the surface of said filter or screen. These accumulations contain egg material which, when recovered, can be sold only as a second-grade product.

Another method which has been suggested is to grind the liquid egg material by the use of burr stones or the like in order to break up the chalaza and stringy portions and to produce a uniform, homogeneous product. One of the chief disadvantages of this process is the fact that it is not easily or simply carried out and the resulting products are not as satisfactory as might be desired. For example, for some unknown reason, when liquid egg whites are subjected to this grinding operation and subsequently fermented and then dried, the products produced are not as uniform as might be expected and the process results in substantial losses by virtue of the non-uniformity of the fermentation. Thus, two grades of dried product are produced thereby resulting in large losses since a substantial amount of the product cannot be considered as constituting a grade A product and must be sold at a cheaper price than the major portion of the egg whites.

Still another method which has been suggested has been to force the liquid egg material through positively acting cutting elements positioned transversely of the line of flow of the egg material in order to comminute the membranous constituents thereof and to provide a homogeneous product. Here, again, the practice of the process still leaves something to be desired from the standpoint of the excellency and uniformity of the product, particularly when subjected to subsequent steps of controlled fermentation followed by drying.

I have evolved a novel method of treating liquid egg material, particularly liquid egg whites, which is simple and inexpensive to carry out and produces a uniform, homogeneous product which, in the case of egg whites, is eminently adapted for subsequent fermentation and drying and which results in marked economies of operation.

It is accordingly an object of my invention to provide an improved method for treating liquid egg material.

Another object is the provision of an improved method for treating liquid egg whites preparatory to drying them.

Still another object of my invention is to provide a novel process of treating liquid egg material, particularly liquid egg whites, whereby the separation of chalaza and foreign bodies is greatly facilitated.

A further object of my invention is to effect the production of an improved egg product by subjecting liquid egg material to a rubbing action whereby the liquid egg whites are rendered thinner, more uniform in character, and whereby the chalaza and other undesired portions may be readily eliminated by a simple straining operation.

A still further object of my invention is the provision of a process for treating liquid egg whites whereby improved products are produced with substantially no wastage of the liquid egg whites.

Other objects and features of my invention will become apparent from a consideration of the following detailed description thereof.

Figure 2:
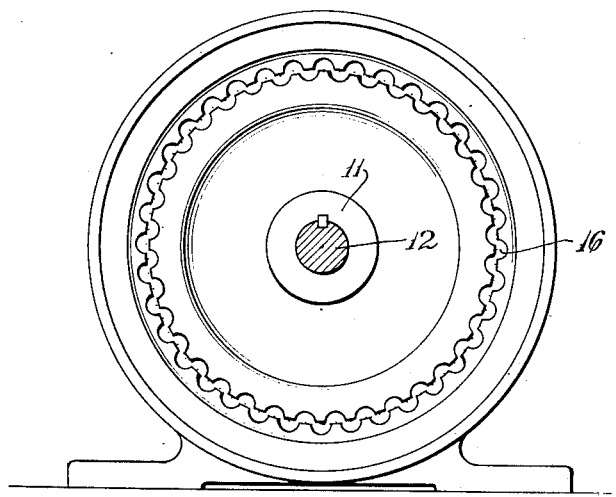

In the accompanying drawing,

Fig. 1 is a longitudinal sectional view showing one form of apparatus with which my novel method may be practiced; and Fig. 2 is a transverse section taken on the line 2—2 of Fig. 1, showing the principal operable parts of the apparatus in elevation.

In general, my process comprises forcing the liquid egg material, for example, whites, as they are removed from the shell and separated from the yokes, by gravity or under pressure in a continuous stream through a narrow space of extended area and formed preferably by members having relative, rapid movement therebetween. In particular, I have found that by forcing liquid egg whites through a narrow passageway formed by an outer stationary member and an inner rapidly rotating member, the inner surface of the stationary member and the exterior surface of the inner rapidly rotating member being generally of conical form and preferably provided with score lines or corrugations, the resulting product becomes thinner, more homogeneous, the chalaza is rubbed loose from the whites and coagulated or denatured or made more compact by the rubbing action in such a manner that it settles readily and is easily filtered by gravity, the compacted chalaza and other undesired portions of the liquid egg whites being readily removed by a simple gravity separating or straining step. It is well known that liquid egg whites contain a thick and a thin portion and it is further well known that the removal of the chalaza, which is slimy, from the liquid egg whites is a somewhat difficult operation. In accordance with my process, the thick portion is broken down by the rubbing action to which it is subjected and the entire product becomes uniform and homogeneous. Furthermore, as has been stated above, the chalaza undergoes such treatment that it may be very simply removed from the treated liquid egg whites by the conventional and well known gravity separation process which is conventionally employed in removing large pieces of shell and the like from liquid egg material in egg treating operations.

While the apparatus which I may employ in carrying out my process may vary, I found that unusually satisfactory results are produced by employing a machine such as the so-called "Charlotte continuous mayonnaise" machine, as is disclosed in the patent to Bayliss M. Dawson, No. 1,807,773, issued June 2, 1931. Other apparatus, however, may be utilized with good results. In general, the type of apparatus which I employ comprises a stator, the inner surface of which is generally conical or frusto-conical in shape, and a rotor which is also conical in shape is spaced from the inner surface of said stator. Means are provided for adjusting the size of the space between the stator and the rotor and the rotor is connected to suitable driving means such as a motor or the like by means of which it is rapidly rotated. I have found that speeds of 1000 R. P. M. to 3500 R. P. M. are especially satisfactory for carrying out the process of my invention although, it will be understood, the speed of the rotor may be varied. Furthermore, I have found that excellent results are obtained when the space between the rotor and the stator is approximately 0.05 of an inch although, here too, good results are obtained by varying this spacing. The liquid egg material is pumped by means of a positive acting pump or the hydrostatic pressure of a head of the liquid egg material is relied upon to force the material through a closed line which leads to the space between the stator and the rotor and it is important that the line be filled with the liquid egg material in order to prevent the incorporation of air therein which would cause undesired foaming. In order to prevent overheating of the egg material, the rubbing surfaces are provided with jackets through which cooling water or the like may be circulated. It will be seen, therefore, that my process contemplates the forcing of the liquid egg material through a narrow space under pressure and in the substantial absence of air. While the pressure under which the liquid egg material is forced through the narrow space may be varied within relatively wide limits, I have found that a very suitable pressure is about 25 pounds per square inch. However, as indicated, hydrostatic pressure of a head of liquid egg material may be employed. It will be understood, therefore, that the term "pressure" is used in a broad sense.

As I have indicated above, liquid egg whites, when treated in accordance with my process, are rendered uniform and homogeneous and become substantially thinner than the egg whites prior to treatment. This treated product, preferably after a simple gravity straining to remove chalaza and the like, may be very effectively treated in accordance with the process of Patent No. 1,818,212 to produce a dried egg white of very high quality. In accordance with the disclosure in this patent, the liquid egg whites are subjected to a controlled fermentation after which they are dried in any desirable manner as, for example, by spray drying or by drying on trays or the like. As a result of the preparatory treatment to which the liquid egg whites are subjected in accordance with my invention, they undergo a uniform fermentation so that substantially all parts thereof undergo the same degree of fermentation; that is, some parts are not overfermented and others underfermented. I regard the subjection of the treated liquid egg whites to a controlled fermentation followed by drying as an important phase of my present invention.

While I have described my invention in conjunction with the treatment of liquid egg whites as they are removed from the shells and separated from the yolks, it must not be inferred that my process is in any wise so limited. I may also treat liquid egg yolks, liquid whole eggs or mixtures of liquid egg whites and liquid egg yolks in any proportions. Similarly, I may treat any of said liquid egg materials to which various addition substances have been added as, for example, sugars, salt, glycerine, small amounts of acids, gums, and other modifying agents such as hydrophilic and lipophilic colloids or colloidal materials. Again, the treated products can be not only dried, as above described, but they may also be frozen. The frozen products when thawed out for use show excellent properties in baking, mayonnaise preparations and the like. The practice of my invention results in definite improvements over the prior art in that products of improved consistency, appearance and utility result. Thus, for example, liquid egg whites treated in accordance with my invention beat up much faster and produce a superior meringue.

As described generally above, the clearance or the space between the stationary and rotating members which, as indicated, may comprise two truncated cones, the exterior one being hollow and stationary and the interior cone which fits thereinto being rotatable, is sufficiently small to effect a severing or dismemberment of the chalaza resulting from the rubbing action as the egg material passes therethrough. This rubbing action causes the chalaza to become more compact or brings about a change in its physical state such that it no longer floats in the body of the egg material but it readily falls to the bottom. It is my belief that the colloidal properties of the gelatinous chalaza, as the result of the treatment to which it is subjected in accordance with my invention, undergo modification resulting in a change in its physical properties as evidenced, for example, by the fact that its gravity is increased.

The egg material, irrespective of whether it constitutes liquid egg whites or mixtures of liquid egg whites and yolks or commercial liquid yolks containing adherent whites, is changed from the standpoint of its physical and colloidal properties as a result of the treatment of my invention. The protein material in the egg whites, as well as in the yolks or mixtures of whites and yolks possesses a certain network, is gelatinous and has a certain viscosity. The rubbing action produced by passing the material through the space, for example, between the truncated cones produces a radical change in the physical properties of the treated egg material and the resultant product becomes less viscous and more tender and homogeneous with the result that, among other things, the products have an improved emulsifying value in baking of cake and the like.

While, as previously indicated, my invention is capable of being practiced by the use of various pieces of equipment, all, however, operating on the same general principle, I have found in actual practice that equipment of the type disclosed in the accompanying drawing may be used with eminent satisfaction. In this particular form of equipment, a stator 10 is provided, and a rotor 11, disposed within the casing which comprises the stator, is adapted to be rotated at a relatively high rate of speed by a shaft 12 on which the rotor is mounted. Any suitable source of power (not shown) may be employed in the usual manner for driving shaft 12. The stator interiorly is of greater longitudinal dimension than the rotor whereby an intake chamber 13 and an outlet chamber 14 are provided. The periphery of the rotor is fluted, as shown in Fig. 2, and also the inside annular face of the stator. Insofar as the maximum diameter of the rotor is concerned, however, it is sufficiently great so that it clears the inner wall of the stator preferably only a few thousandths of an inch, as clearly indicated in Fig. 2. Thus, a narrow but irregular annular passageway 16 is provided between the stator and rotor. The rotor, in effect, comprises also a section of a cone, and the inside wall of the stator is correspondingly shaped so that the narrow passageway 16, while annular, slopes outwardly in the direction from the intake chamber 13 to the outlet chamber 14. The liquid egg material is delivered to the inlet chamber 13 through pipe 17, flow being induced partly by gravity and partly by suction within the intake chamber, although some pressure, in addition to the mere pressure of gravity, may be employed, if desired, to force the liquid egg material into the chamber 13. The liquid egg material flows partly by gravity and partly through pressure from the outlet chamber 14, through the discharge pipe 18, whence it may be deposited in a suitable receptacle 19 provided for the purpose.

The equipment shown in the drawing is, of course, provided with suitable bearings, packing, lubricating means, and the like, customarily employed in equipment of this general nature, but I deem it unnecessary to show or describe these features in detail since they do not comprise an essential part of my present invention. Moreover, the disposition and relation of parts is purely illustrative and not in any sense meant to be limiting insofar as the practice of my method is concerned.

The description of my invention, as set forth above, is to be taken as illustrative and in no sense limitative of the full scope thereof, the latter being pointed out in the claims.

What I claim as new and desire to protect by Letters Patent of the United States is:

1. A method of treating liquid egg whites which comprises forcing them, under pressure and in a continuous stream, through a narrow space between extended surfaces of a stationary outer member and a rapidly rotating inner member whereby said liquid egg whites undergo a rubbing action and are rendered thinner and whereby undesired matter such as chalazae become readily separable therefrom.

2. A method of treating liquid egg whites which comprises forcing them, under pressure and in a continuous stream, through a narrow space between extended surfaces of a stationary and a rapidly rotating member whereby said liquid egg whites undergo a rubbing action and are rendered thinner and whereby undesired matter such as chalazae become readily separable therefrom.

3. A method of treating liquid egg whites which comprises forcing them, under pressure, through a closed line in the form of a continuous stream into and through a narrow space between extended surfaces of members having rapid relative movement whereby said liquid egg whites undergo a rubbing action and are rendered thinner and whereby undesired matter such as chalazae become readily separable therefrom.

4. A method of treating liquid egg whites which comprises forcing them, under pressure, through a closed line in the form of a continuous stream into and through a narrow space between extended surfaces formed by generally conically shaped cooperating members one of which is stationary and the other of which rapidly rotates whereby said liquid egg whites undergo a rubbing action and are rendered thinner and whereby undesired matter such as chalazae become readily separable therefrom.

5. In a method of preparing dried egg whites from controlledly fermented liquid egg whites, the preliminary step which comprises forcing egg whites, directly as removed from the shell and separated from the yolk, under pressure and in a continuous stream through a narrow space between extended surfaces of a stationary outer member and a rapidly rotating inner member whereby said liquid egg whites undergo a rubbing action and are rendered thinner and whereby undesired matter such as chalazae become readily separable therefrom.

6. The method of claim 5 wherein the space between the extended surfaces is of the order of about 0.05 of an inch.

7. A method of treating liquid egg whites preparatory to controlledly fermenting and drying the same which comprises providing a narrow space of substantial area between a stationary and a rapidly rotating member, and forcing said liquid egg whites under pressure in a continuous stream and in the substantial absence of air through said space whereby said liquid egg whites undergo a rubbing action and are rendered thinner and whereby undesired matter such as chalazae become readily separable therefrom.

8. A method of treating liquid egg whites preparatory to controlledly fermenting and drying the same which comprises providing a narrow space of substantial area between a stationary outer member and a rapidly rotating inner member, the surfaces defining said space being scored or corrugated, and forcing said liquid egg whites under pressure in a continuous stream and in the substantial absence of air through said space whereby said liquid egg whites undergo a rubbing action and are rendered thinner and whereby undesired matter such as chalazae become readily separable therefrom.

9. A method of treating liquid egg materials which comprises forcing them, under pressure and in a continuous stream, through a narrow space between extended surfaces of a stationary and a rapidly rotating member whereby said liquid egg materials undergo a rubbing action and are rendered thinner and whereby undesired matter such as chalazae become readily separable therefrom.

10. A method of treating liquid egg materials which comprises forcing them, under pressure, through a closed line in the form of a continuous stream into and through a narrow space between extended surfaces formed by generally conically shaped cooperating members one of which is stationary and the other of which rapidly rotates whereby said liquid egg materials undergo a rubbing action and are rendered thinner and whereby undesired matter such as chalazae become readily separable therefrom.

11. A method in accordance with claim 9 wherein the liquid egg material comprises liquid egg yolks.

MARVIN C. REYNOLDS.